United States Patent [19]
Pejic et al.

[11] Patent Number: 5,956,018
[45] Date of Patent: Sep. 21, 1999

[54] COMPACT POINTING CONTROL STICK CIRCUIT BOARD ASSEMBLY HAVING ELECTRICAL VIAS

[76] Inventors: Nenad Pejic, 10241 Foxwood Dr., North Royalton, Ohio 44133; James C. Scott, 19665 Roslyn Dr., Rocky River, Ohio 44116

[21] Appl. No.: 08/934,244
[22] Filed: Sep. 19, 1997
[51] Int. Cl.$^6$ ....................................................... G09G 5/08
[52] U.S. Cl. ........................ 345/157; 345/161; 200/6 A; 74/471 XY
[58] Field of Search .................... 345/157, 158, 345/156, 161, 164, 173; 341/168, 169; 74/471 XY; 200/6 A, 5 A; 174/262, 250; 257/774, 700, 758; 361/803

[56] References Cited

U.S. PATENT DOCUMENTS

| | | | |
|---|---|---|---|
| 4,388,672 | 6/1983 | Skill | 361/803 |
| 5,347,091 | 9/1994 | Schroeder | 174/262 |
| 5,541,622 | 7/1996 | Engle et al. | 345/161 |
| 5,579,033 | 11/1996 | Rutledge et al. | 345/161 |
| 5,870,078 | 2/1999 | Olyha, Jr. et al. | 345/157 |

Primary Examiner—Richard A. Hjerpe
Assistant Examiner—Francis Nguyen

[57] ABSTRACT

A hand-held pointer control and input device has a case configured to be gripped by a right or left hand, with a curved back surface which fits against a palm of a hand gripping the device, a saddle-shaped surface configured to support and position a thumb of the gripping hand for operation of a cursor control device which protrudes from the top surface, and a curved button mounting surface positioned generally opposite the curved back surface and with at least one control button incorporated therein. The device enables control of a display cursor and input of control commands which correspond to a position of a cursor with a single hand and without contacting the device with a reference surface. A modular pointing stick and circuit board assembly is also provided. The modular pointing stick and circuit board assembly includes a first mounting surface having a pointing stick assembly and electrical tracks mounted thereon and a second mounting surface disposed generally opposite the first mounting surface and having circuitry for translating output signals from the pointing stick assembly and electrical tracks mounted thereon. At least one electrical via or other connection device provides circuit communication between the first and second mounting surfaces to thereby provide "space-saving" modular pointing stick and circuit board assembly.

18 Claims, 7 Drawing Sheets

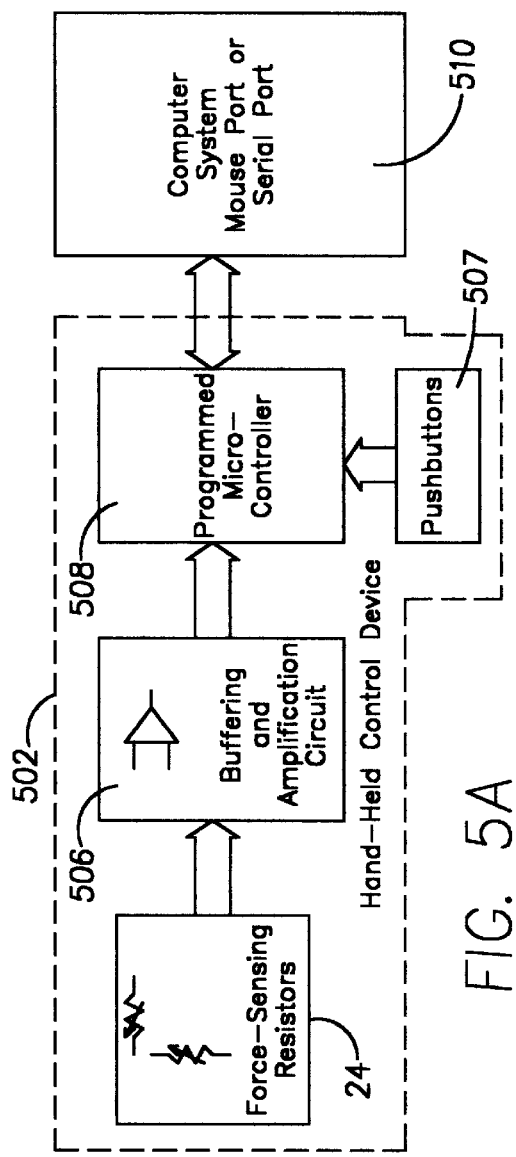
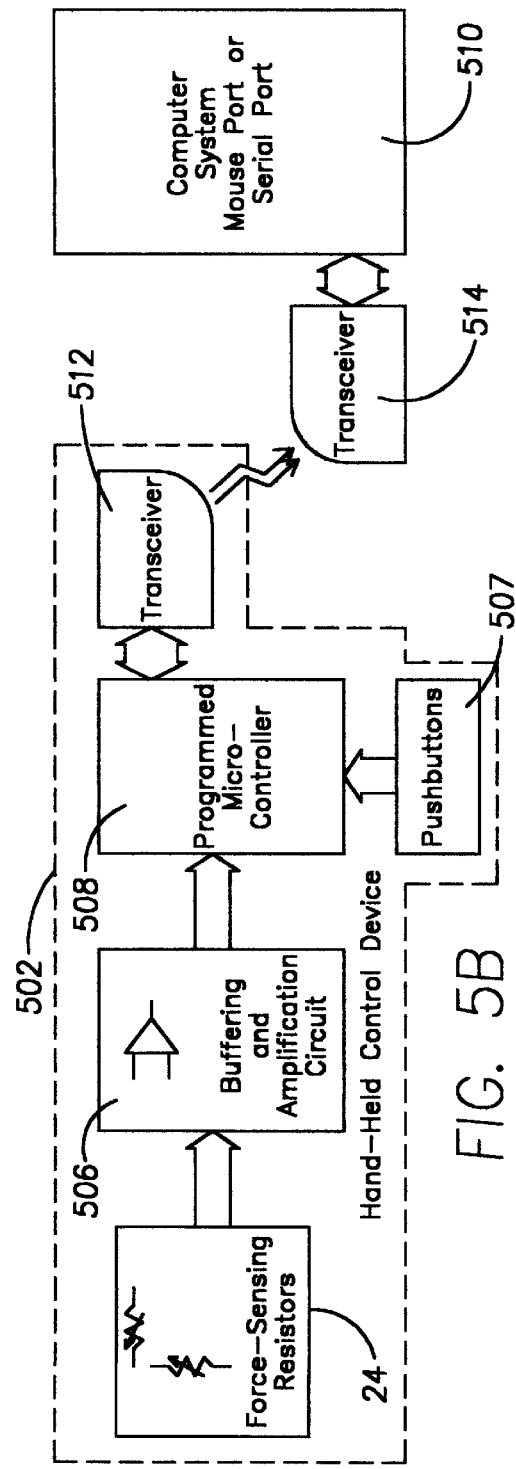
FIG. 5A
FIG. 5B

COMPACT POINTING CONTROL STICK CIRCUIT BOARD ASSEMBLY HAVING ELECTRICAL VIAS

FIELD OF THE INVENTION

The present invention pertains generally to computer input and control peripheral devices and, more particularly, to peripheral devices for controlling a position of a cursor or pointer on a display screen and inputting a selection which corresponds to a position of the cursor.

BACKGROUND OF THE INVENTION

"Mouse" computer input devices were invented in the 1970s to improve the interface between man and machines. Such mouse input devices allow a user to control a position of a cursor or pointer on a computer screen and enable user input to a computer based upon the position of the cursor, without the use of keys on a conventional keyboard. This type of peripheral device was well-suited for the newly developed "point-and-click" graphical user interface format of software. Generally, all mouse cursor control devices require some sort of planar surface such as, for example, a desktop or mouse pad, for proper operation. This requirement is disadvantageous because it physically restrains a user to remain very near the computer, monitor, or work station, in order to control the mouse. This confined proximity can produce several undesirable effects such as, for example, eye strain from sitting too close to a computer display and arm fatigue from having to continuously extend a hand out to reach the mouse on the planar surface.

As alternatives to the mouse, other types of cursor control devices have been developed such as, for example, "track-ball" type cursor controllers, the GlidePoint® manufactured by Cirque Corp. of Salt Lake City, Utah, and the TrackPoint® manufactured by IBM Corp. of Armonk N.Y. The track-ball type of cursor controller allows a user to rotate a ball in various directions to directly move a cursor on the screen. Many track-ball controllers, however, suffer from an undesirable effect: the high degree of freedom of rotation of the track-ball within its mounting socket makes accurate control of cursor position somewhat difficult. This can be particularly frustrating to a user where accurate control of a cursor is required, such as in computer-aided drafting and other graphical applications. This undesirable effect is present whether the track-ball controller is mounted within a keyboard, incorporated into a hand-held unit, or exists as a table mounted stand-alone unit. Additionally, the mechanical components of track-ball type controllers do not lend themselves to miniaturization where space and weight considerations are very important. The GlidePoint® controller includes a capacitance sensitive planar pad which detects the presence of a human finger thereon. Since a planar pad is required for detecting and tracking the motion of a user's finger thereon, the GlidePoint® also suffers from the disadvantage of not being amenable to miniaturization for "space-saving" applications. The TrackPoint® is a small, light, force-sensing stick assembly which is typically incorporated into a keyboard, between the G, H and B keys. In essence, a user merely pushes against the TrackPoint® to move a cursor in a desired direction. However, because the device is in the keyboard, it continues to restrain the user to be within reach of the keyboard in order to point, click, drag, draw, or perform any other cursor or pointer related operations.

Weight and "space-saving" considerations are very important when incorporating cursor control devices into computer systems such as, for example, laptop or notebook computers. Accordingly, "space-saving" circuit board designs reduce or make available additional valuable space in computer systems. However, the nature of most cursor control circuitry is such that low-level analog signals are produced. This particularly true for TrackPoint® type controllers. Accordingly, certain precautions such as, for example, the avoidance of digital signal "pickup" into analog circuits, must be considered when designing a "space-saving" circuit board design. Therefore, a small, highly compact, "space-saving" circuit board design which does not intrude on the limited space of a computer system and provides the required electrical isolation from the noise generated by central processing units (CPU's), video lines, buses, or any other digital signal sources, is highly desirable.

SUMMARY OF THE INVENTION

According to one aspect of the present invention, a cursor control and input device for use with a machine having a display is provided. The device has an ergonomic housing suitable for gripping by a human hand. The housing has a first curved surface having a plurality of concave and curved portions configured for contact with the fingers of a hand, a second curved convex surface disposed generally opposite the first curved surface, and a substantially planar third surface having at least one aperture for providing access to a pointing control stick. The second curved surface has a convex and curved portion configured for contacting the palm of a hand which transitions to a concave and curved portion configured for cradling the thumb of a hand. The concave and curved portion configured for cradling the thumb of a hand transitions to the substantially planar third surface through which a pointing control stick protrudes. The first curved surface transitions to the second curved surface and the substantially planar third surface transitions to the first curved surface. The device further includes circuitry configured to generate cursor control and input signals for a computer system.

And in accordance with another aspect of the invention, there is provided a combined pointer control device and pointer control device circuit module and assembly formed as a single drop-in unit for providing accurate pointer control signals in any device. The assembly has a first mounting surface, a second mounting surface disposed generally opposite the first mounting surface, and at least one electrical via extending from the first mounting surface through to the second mounting surface. The first mounting surface has a pointing control stick assembly thereon and at least one first mounting surface electrical track in circuit communication with the pointing stick assembly. The second mounting surface has circuitry for translating signals output from the pointing control stick assembly to the machine and at least one second mounting surface electrical track in circuit communication with the circuitry. The electrical via provides for placing the at least one first mounting surface electrical track in circuit communication with the at least one second mounting surface electrical track and, therefore, the pointing control stick assembly in circuit communication with the circuitry for translating.

It is therefore an advantage of the present invention to provide a hand-held control and input device which has an ergonomic housing including a convex surface adapted to fit against a palm of a right or left hand in a gripping position.

It is another advantage of the present invention to provide a hand-held control and input device which has saddle-shaped thumb support surface for supporting and cradling a thumb of a hand in a comfortable control position.

It is yet another advantage of the present invention to provide a hand-held control and input device which provide a tactile feedback based on a display cursor or pointer movement.

It is another advantage of the present invention to provide a pointing control stick and circuit board assembly which is modular and "standardized" so as to be easily implementable in a wide variety of machines.

It is another advantage of the present invention to provide a small and compact pointing control stick and circuit board assembly which is particularly suitable for "space-saving" computer system applications.

It is yet another advantage of the present invention to provide a pointing control stick and circuit board assembly which provide proper analog signal isolation of a pointing control stick.

These and other advantages will be apparent from the detailed description of the various embodiments and drawings thereof.

BRIEF DESCRIPTION OF THE FIGURES

In the accompanying drawings which are incorporated in and constitute a part of the specification, embodiments of the invention are illustrated, which, together with a general description of the invention given above, and the detailed description given below, serve to example the principles of this invention.

FIGS. 5A and 5B are block diagrams of circuit components of a hand-held pointer control and input device of the present invention.

DETAILED DESCRIPTION OF PREFERRED AND ALTERNATE EMBODIMENTS

Figure 1D:
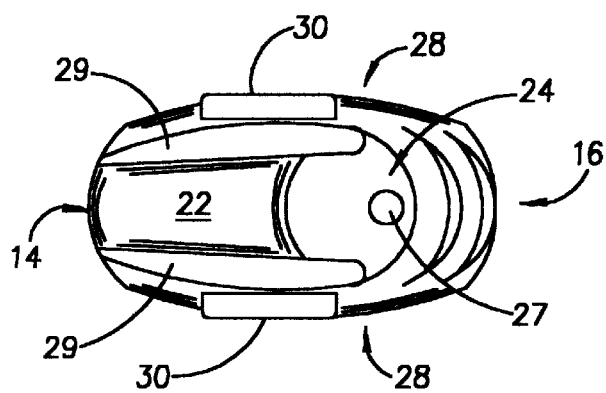
FIG. 1D is a top view of the device of FIG. 1A, taken in the direction of the arrows 1D—1D in FIG. 1A.
Figure 1B:
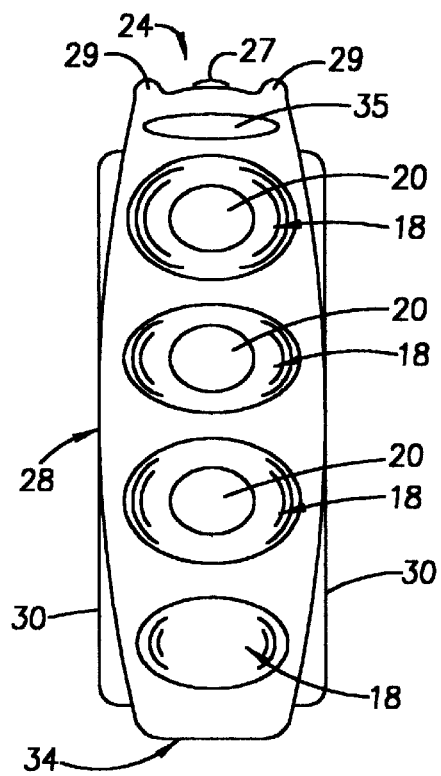
FIG. 1B is a front elevational view of the device of FIG. 1A, taken in the direction of the arrows 1B—1B in FIG. 1A.
Figure 1A:
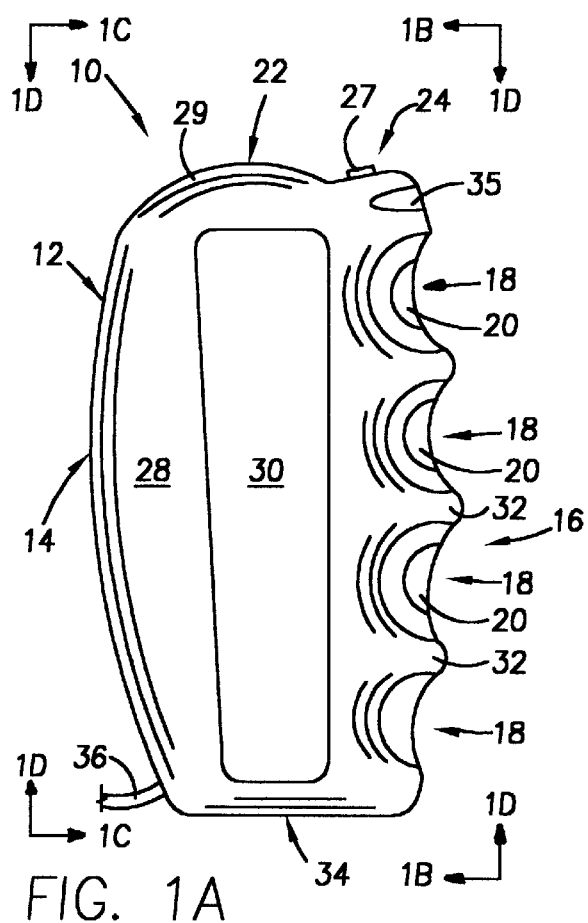
FIG. 1A is a side elevational view of one embodiment of a hand-held pointer control and input device of the present invention.
Figure 1C:
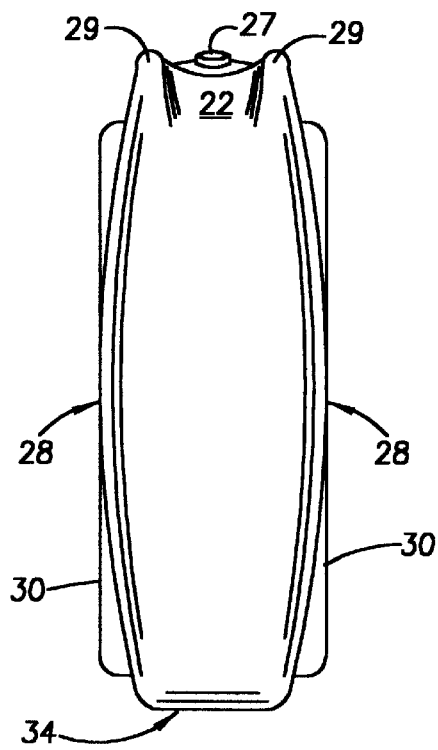
FIG. 1C is a rear elevational view of the device of FIG. 1A, taken in the direction of the arrows 1C—1C in FIG. 1A.
Figure 2D:
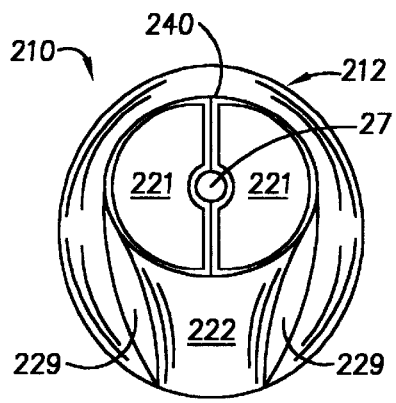
FIG. 2D is a top view of the device of FIG. 2A, taken in the direction of the arrows 2D—2D in FIG. 2A.
Figure 2B:
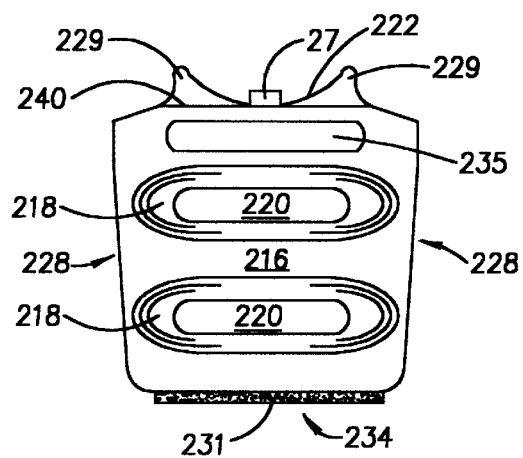
FIG. 2B is a front elevational view of the device of FIG. 2A, taken in the direction of the arrows 2B—2B in FIG. 2A.
Figure 2A:
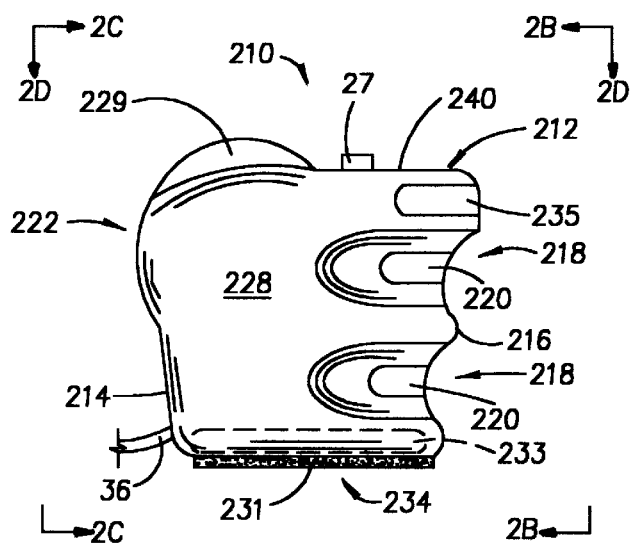
FIG. 2A is a side elevational view of an alternate embodiment of a hand-held pointer control and input device of the present invention.
Figure 2C:
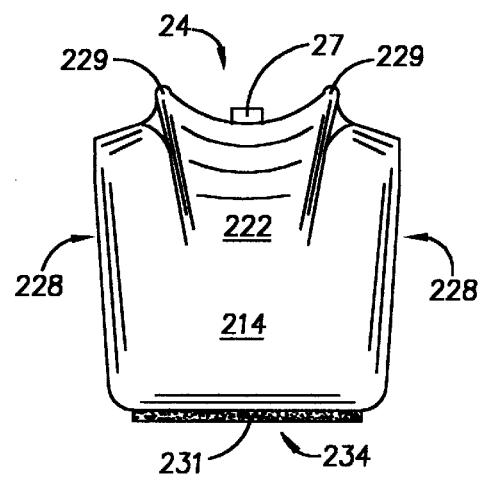
FIG. 2C is a rear elevational view of the device of FIG. 2A, taken in the direction of the arrows 2C—2C in FIG. 2A.

Before describing the preferred and alternate embodiments of the present invention, it should be noted that common features of the embodiments have been labeled with common reference numerals in the drawings. Any distinctions between common features are either described in the text or shown in the accompanying drawings. Accordingly, the various embodiments of the present invention will now be described.

With reference to FIGS. 1A–1D, there is shown one embodiment of a hand-held pointer control and input device of the present invention, indicated generally at 10, which includes a body or case 12, dimensioned and configured to fit substantially within the grip of a right or left human hand. The case 12 has a curved convex surface 14 which is preferably configured to substantially fit against a palm of a hand gripping the device and a curved button mounting surface 16 (also referred to as a control button mounting surface) positioned generally opposite to the curved surface 14. The curved button mounting surface 16 is preferably convex and curved and includes one or more concave and curved finger indentations 18 dimensioned to receive and cradle the fingers of a hand gripping the case. One or more computer control input buttons 20 are mounted within the case and on the curved button mounting surface 16, and are preferably located within the finger indentations 18, and even more preferably flush mounted or recessed within the finger indentations. The buttons 20 are connected to two-position click-type switches mounted within the case, to select and input control signals, as further described herein. The curved button mounting surface 16 is positioned generally opposite to the curved convex surface 14 so that the curved convex surface 14 is compressed against the palm as the fingers grip the case and squeeze to operate the buttons 20.

The curved surface 14 has a convex and curved portion (also indicated by 14) for contacting the palm of a hand, and transitions to a concave and curved surface portion 22 configured for cradling the thumb of a hand. The transition may be at a distinct area or location on curved surface 14, or may be a smooth and continuous transition from a mid-point, or other point, on the curved convex surface 14 to the concave and curved surface 22. The latter transition is preferred. The convex and curved portion 14 is based on a convex quadric. Suitable quadrics include, for example, spheres, spheroids, ellipsoids, hyperboloids of two sheet surfaces, toroids, and elliptic paraboloids. The concave and curved surface 22 has a saddle-shaped surface, best seen in FIG. 1C, which is based on a portion of a surface of a concave quadric. This saddle shape of the concave and curved surface 22 provides ergonomic support for a thumb to operate a pointing stick. Suitable concave quadratics include, for example, hyperbolic paraboloids and hyperboloids of a single sheet. The aforementioned quadric lists are not intended to be exhaustive are also applicable to other concave and convex features of the embodiments of the present invention described hereinafter. The concave and curved surface 22 transitions to a substantially planar surface 40. Once again, a smooth transition from concave and curved surface 22 to substantially planar surface 40 is preferred. The substantially planar surface 40 has an aperture for providing access to a pointing control stick 27 of pointing device assembly 24 and transitions to the generally convex and curved button mounting surface 16. The pointing device assembly 24 (also referred to herein as a computer cursor control device) is mounted within the case so that the pointing stick 27 protrudes through the surface 40, for contact by a thumb pad of a thumb overlying the surface 40. The pointing device assembly 24 is preferably a force sensitive type device such as a force-sensing resistor network which is attached to a riser member or pointing stick 27. As will be described, one such suitable pointing device assembly 24 includes, for example, the TrackStik™ manufactured by CTS Corp. of Berne, Ind. An upper distal end of the pointing control stick 27 protrudes from the substantially planar surface 40 of the case 12. The surface of the pointer control stick 27 may be provided with a high-friction texture to enhance accurate control of the pointing stick by a thumb or finger pad.

Opposed thumb support flanges 29 extend from the concave and curved surface 22 and/or curved convex surface 14 to extend the saddle-shape configuration of surface 22, and to flank a thumb positioned thereon and to retain the thumb in a desired control position. Side surfaces 28 on the case 12 may each include a generally planar contact area 30 on which the case can be laid on a supporting surface such as a desktop. In a generally horizontal position resting upon contact area 30, the thumb support flanges 29 are especially advantageous for supporting the thumb in a device operating position with the thumb pad positioned for contact with the pointer control stick 27 of the pointing device assembly 24. This position of the case is also ideal for grasping the device with a hand in the palm-down position, and for lifting the device to hold and use it in space, or to simply grip the device and use it while on a supporting surface. Additional contact areas 32 may be generally planar to enable stable positioning of the device on a supporting surface. For example, contact areas 32 may be positioned between the finger indentations 18 on the curved button mounting surface 16 to allow the device to be positioned upon a surface with the buttons 20 facing down. This allows the device to be grasped by squeezing the side surfaces 28 and 30 only, thereby avoiding inadvertent operation of the buttons 20 as the device is picked up.

Curved button mounting surface 16 transitions to curved and convex surface 14 along a surface 34. The surface 34 is generally opposite to substantially planar surface 40 and extends between the side surfaces 28. In accordance with the invention, a height dimension of the case, as measured from the substantially planar surface 40 to the transition surface 34, is preferably selected to substantially fit entirely within a palm of a hand holding the device or, in other words, to not be substantially greater than a width of a palm, and in other embodiments to be less than a width of a palm so that the device fits entirely within a grip of a hand.

FIGS. 2A–2D illustrate an alternate embodiment of a device 210 wherein the case 212 has a somewhat reduced height dimension, and two finger indentations 218 on a curved button mounting surface 216. Of course, it is within the scope of the invention to construct the case to be even smaller, owing to the compactness of the pointing device assembly 24, the input buttons 220 and the connected circuitry, all housed within the case as further described herein. In the illustrated embodiment, the height dimension of the case 212, measured from a generally planar surface 240 to the transition surface 234, is not substantially greater than a combined width of two finger indentations 218, so as to make the control device 210 very small and able to fit entirely within the grip of a hand. The transition surface 234 is generally planar and relatively expansive in order to provide a stable resting surface for the device upon a supporting surface such as a desktop or mouse pad. Although the device is preferably held in space during use, i.e., not in contact with a surface (in the manner of a typical mouse), it is still necessary to set it down between uses. The transition surface 234 provides an ideal surface for this purpose. The curved surface 214 transitions from a convex and curved surface near transition surface 234 to a concave and curved surface portion 222 which extends through thumb support flanges 229. Concave and curved surface portion 222 further smoothly transitions to substantially planar pointer control mounting surface 240.

The position of the control input buttons 220 on the curved button mounting surface 216 allows the device to be picked up (from the position resting on the bottom surface) by grasping the side surfaces 228 of the case 212, in order to avoid inadvertent punching of the buttons 220. This arrangement is critical to efficient use of the device, which may be picked up and set down many times during extended use in connection with a computer or other apparatus having a display. A ballasting weight 233 within the case near the transition surface 234 may be included if required to additionally stabilize the device with the transition surface 234 firmly in contact with a supporting horizontal surface. A pad 231 made of anti-skid material may be attached to transition surface 234 to secure the device in a resting position upon a desktop. Additional or alternate input buttons 221 may be positioned for access at the substantially planar surface 240, immediately adjacent to and substantially surrounding the pointer control stick 27 of the pointing device assembly 24, thus allowing the device to be entirely operated by a single thumb. The right and left arrangement of buttons 221 is ideally suited for configuring the device for "right-click" or "left-click" operation. Thus, as with control buttons 220, the device is configured or configurable for right or left hand use. Buttons 221 may contoured so as to be contiguous with substantially planar surface 240 or may be contoured so as to be discontinuous with the generally planar pointer control mounting surface 240 (e.g., generally convex or concave.) A cable for providing power to the device and an electrical connection to an associated computer and display is indicated at 36.

Figure 3A:
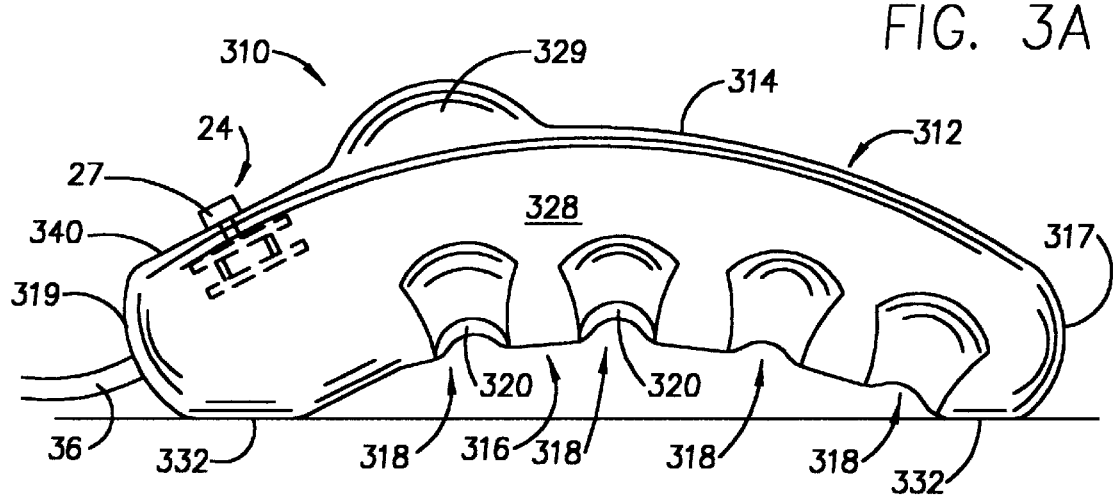
FIG. 3A is a side elevational view of an alternate embodiment of a hand-held pointer control and input device of the present invention.

FIGS. 3A–3D illustrate another alternate embodiment of the invention wherein a control device 310 has a case 312 which is generally elongate and somewhat arched or curved in profile as shown in FIG. 3A. Generally planar contact areas 332 are formed on a curved button mounting surface 316 so that control buttons 320, mounted flush or recessed within finger indentations 318, are oriented downward with the device resting on a horizontal surface. The case 312 can thus be readily gripped and lifted by grabbing the sides 328, without inadvertently contacting one of the control buttons 320. The generally arched configuration of the case fits in the grip of a right or left hand with the fingers positioned within the finger indentations 318, and the thumb is cradled between the thumb support flanges 329 which protrude from the curved surface 14 to form a laterally concave, saddle-shaped support surface for a thumb. In this embodiment also, the curved surface 314 transitions from a convex and curved surface near end 317 to a concave and curved surface portion 322 extending through thumb support flanges 329. In this embodiment also, the concave and curved surface portion 322 smoothly transitions to substantially planar surface 340 through which the pointing stick protrudes. As with the previously described embodiments, the invention is characterized in part by the configuration of the case including a convex surface adapted to fit against a palm, which transitions to a concave surface which supports a thumb for operation of the pointing stick.

Figure 3B:
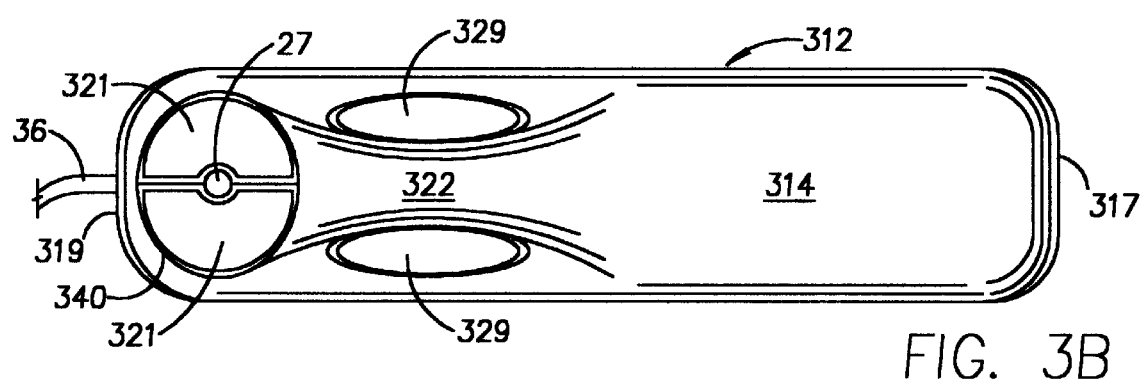
FIG. 3B is a top view of the device of FIG. 3A, taken in the direction of the arrows 3B—3B in FIG. 3A.
Figure 3C:
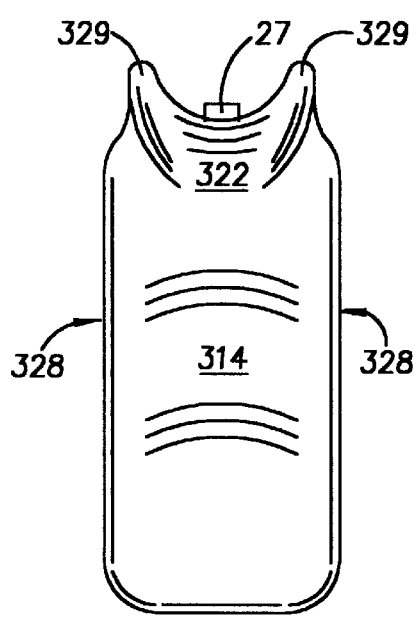
FIG. 3C is a rear elevational view of the device of FIG. 3A, taken in the direction of the arrows 3C—3C in FIG. 3A.
Figure 3D:
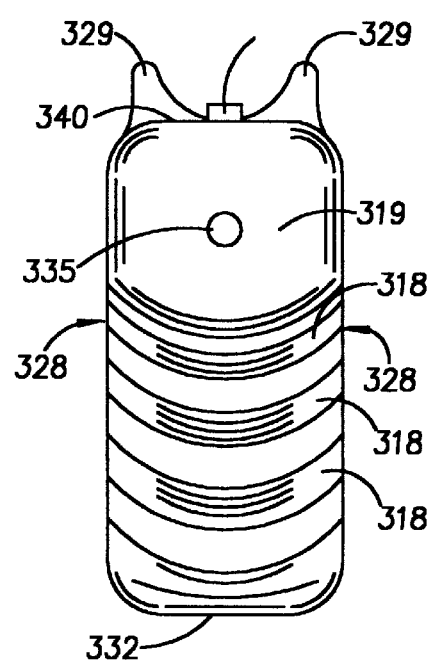
FIG. 3D is a front elevational view of the device of FIG. 3A, taken in the direction of the arrows 3D—3D in FIG. 3A.

The length of the case, from a front end 319 to rear end 317, is preferably approximately equal to or greater than the width of a hand in a gripping position, including a combined width of four fingers and a thumb in an extended position. The pointing device 24 is positioned at a generally forward end of the curved surface 314 of the case 312, at planar surface 340, for control by a thumb pad of the gripping hand. As shown in FIG. 3B, alternate or additional control buttons 321 may be positioned upon the curved surface 314 for access adjacent to or about the pointer control stick 27. As shown in FIG. 3B, control buttons 321 substantially surround the pointer control stick 27. As shown in FIG. 3D, an IR (i.e., infrared) transmitting window 335 may be located at a front end 319 of the case for transmitting signals of appropriate circuitry within the case to a computer or other machine. The cable 36, shown in FIG. 3A extending from front end 19, would of course be eliminated in such embodiments.

Figure 4A:
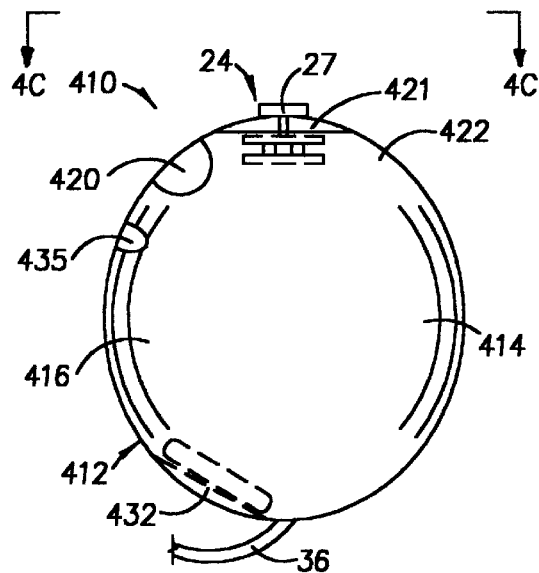
FIG. 4A is an elevational view of an alternate embodiment of a hand-held pointer control and input device of the present invention.
Figure 4B:
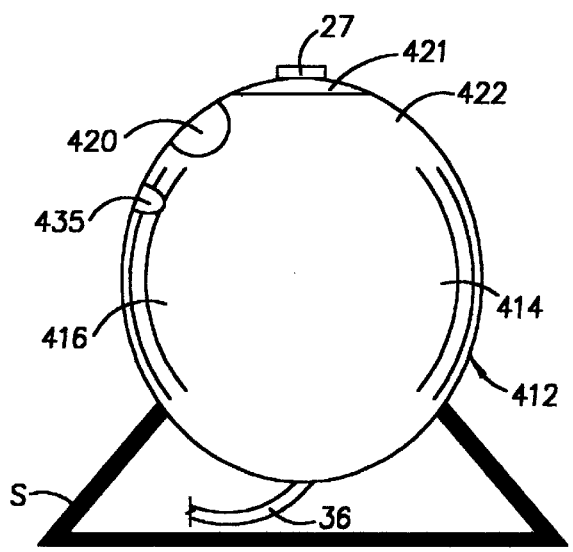
FIG. 4B is an elevational view of the device of FIG. 4A.
Figure 4C:
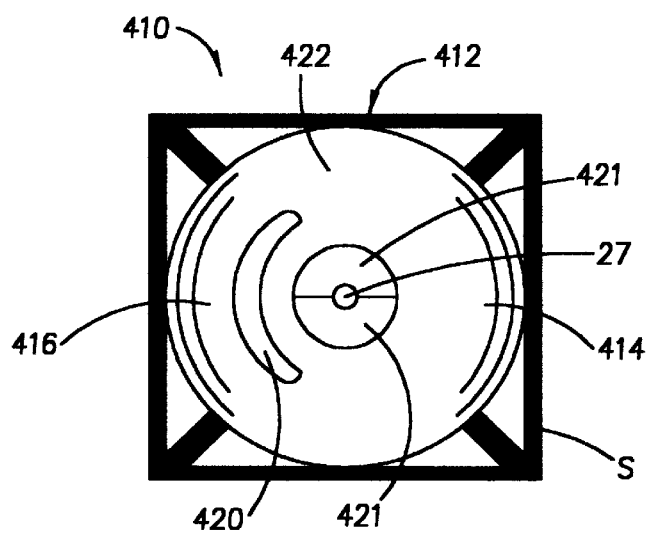
FIG. 4C is a top view of the device of FIG. 4A, taken in the direction of the arrows 4C—4C in FIG. 4A.

FIGS. 4A–4C illustrate an alternate embodiment of the invention wherein a device 410 has a case 412 with an external configuration which is generally spherical or ellipsoid. The case 412 thus has, in profile as shown in FIGS. 4A and 4B, a generally curved convex palm surface 414 which fits comfortably within and conforms to a palm of a hand in a gripping position, and a generally curved convex finger gripping and control surface 416 which is generally opposite to the convex palm surface 414. The pointer control stick 27 of the pointing device assembly 24 protrudes from an upper area or top 422 of the case, and the cable 36 extends from a lower area or bottom 434 of the case. The pointer control stick 27 thus extends or protrudes from an uppermost point of the case when the case is in a generally upright position, as it would be gripped by a hand during use, with the cable 36 extending downward. Control button or buttons 420, 421 are located proximate to the pointer control stick 27. Control buttons 421 are immediately adjacent to and surrounding the pointer control stick 27. A control signal transmission window 435 can be formed in the case, for example in the curved button mounting surface 416. A stand S may be provided to receive and support the case in a resting position. With the case in a generally upright position in stand S, as shown in FIGS. 4B and 4C, the device 410 can be operated in a stationary position, e.g., upon a desktop. Alternatively, the exterior of the generally spherical case 412 may include a generally planar area 432 for resting upon a support surface, with a corresponding ballast 433 inside the case proximate to area 432. By this construction, the device is self-orienting upon planar area 432 when set upon a horizontal surface. As shown in FIGS. 4A and 4B, the generally spherical or egg-shape of the case 412, provides a generally curved convex surface 414 which fits comfortably within the palm of a gripping hand, and a generally curved convex button mounting surface 416 opposite to the curved surface 414 against which the fingers of a gripping hand press to grasp the case, with the thumb and index finger of the gripping hand free to operate the pointing control stick 27 of the pointing device assembly 24 and the control buttons 420, 421.

Illustrated in FIGS. 5A and 5B are block diagrams of the electrical components of the present invention operative to communicate signals to an associated computer or machine or display to control the movement and position of a cursor or pointer according to movements of the control device 24, and according to inputs of the control buttons 20 and 21. In particular, FIG. 5A illustrates a preferred embodiment and FIG. 5B illustrates an alternative embodiment having wireless characteristics. Referring now specifically to FIG. 5A, the hand-held control device 502 of the present invention includes a pointing device assembly 24 having a plurality of force-sensing resistors for indicating the direction of a force being applied to the pointing device assembly 24. The pointing device assembly 24 outputs a plurality of analog signals based on the stresses and strains applied to the assembly. A suitable pointing device assembly 24 includes, for example, the TrackStik™ manufactured by CTS Corp. of Berne, Ind.

The pointing stick assembly 24 may also have a tactile feedback device (not shown). The tactile feedback device includes an actuating means which generates a pulsed, upward force causing the pointing stick assembly 24 to slightly displace in the z-axis direction. Suitable tactile feedback devices include, for example, piezoelectric transducers and solenoids. The tactile feedback device can be used to provide tactile feedback to a user upon one or more transition events. A transition event is defined as the transition of a screen pointer device from one predefined portion of the display to another. For example, a transition event would generated when the screen pointing device transitions from a background area or object (i.e., a windows desktop) to a foreground area or object (i.e., one or more windows or icons representing objects, folders, or programs.) Upon the occurrence of a transition event, at least one pulse from the tactile feedback device would be generated to indicate the aforementioned transition to the user.

The pointing device assembly 24 may further include a Z-axis selection switch for facilitating "click and drag" operations of many windows-based operating systems. The Z-axis selection switch is activated upon a depression of the pointing control stick 27 of the pointing stick assembly 24 allowing for the commonly known "click" function. During such a depression, the pointing stick assembly's directional outputs in the X and Y-axis directions remain active allowing for the commonly known "click and drag" function by sole manipulation of the pointing control stick 27. The Z-axis selection switch is shown and described in FIG. 6D and the text associated therewith.

The pointing device assembly 24 is in circuit communication with a buffering and amplification circuit 506. The buffering and amplification circuit 506 provides for electrical isolation and translation of the pointing device assembly 24 output. The translation may be by any one of a plurality of operational amplifiers including, for example, inverting, non-inverting, unity-gain follower, transconductance, and transimpedence amplifiers. The aforementioned list is not intended to be exhaustive. The buffering and amplification circuit 506 preferably employs a conventional buffer/amplification operational amplifier circuit.

The output of the buffering and amplification circuit 506 is input into a programmed micro-controller 508. The micro-controller 508 includes ROM-based logic for translating the output of the pointing stick assembly 24 into conventional serial or mouse port signals for input to a computer system. More specifically, the micro-controller 508 includes an analog input port for receiving the output of the buffering and amplification circuit 506. The analog signals are then translated by the logic in the micro-controller into convention serial or mouse port signals for input into a computer system serial or mouse port 510. The micro-controller also includes an I/O port for the input of signals generated by pushbuttons 507 (which include, for example, the aforementioned control buttons and Z-axis selection switch) for translation to the computer system serial or mouse port 510. The micro-controller further includes a tactile I/O for receiving tactile output information from the computer system and outputting a tactile signal to a tactile actuating device. Suitable micro-controllers having the required ROM-based logic include, for example, the TPM749 and TPM754 micro-controllers with TrackPoint® microcode from IBM Corp. and are manufactured by Philips Semiconductors of Sunnyvale, Calif. Other similar programmable micro-controllers can also be employed.

Referring now to FIG. 5B, an alternative embodiment of the hand-held control device circuitry of FIG. 5A having wireless characteristics is shown. In particular, the circuit embodiment of FIG. 5B includes the same elements as the circuit of FIG. 5A with the addition of transceivers 512 and 514. Transceiver 512 receives the output of the micro-controller 508 and wirelessly transmits it to transceiver 514 which is in circuit communication with the computer system serial or mouse port 510. Transceivers 512 and 514 can be based on conventional infra-red or radio-frequency technology, or a combination of both. In this manner, the need to provide, for example, a cord or cable between the hand-held control device and the computer system, is eliminated.

The nature of the circuitry of FIGS. 5A and 5B are such that low-level analog signals are produced. Accordingly, certain precautions such as, for example, the avoidance of digital signal "pickup" into the analog circuit, must be considered. Connected therewith, most hand-held control devices and computer systems have a finite, limited amount of space available for circuit inclusion. Accordingly, a small, highly compact, "space-saving" circuit board design which does not intrude on this limited space and provides the required electrical isolation from the noise generated by central processing units (CPU's), video lines, buses, or any other digital signal sources, is highly desirable.

Figure 6A:
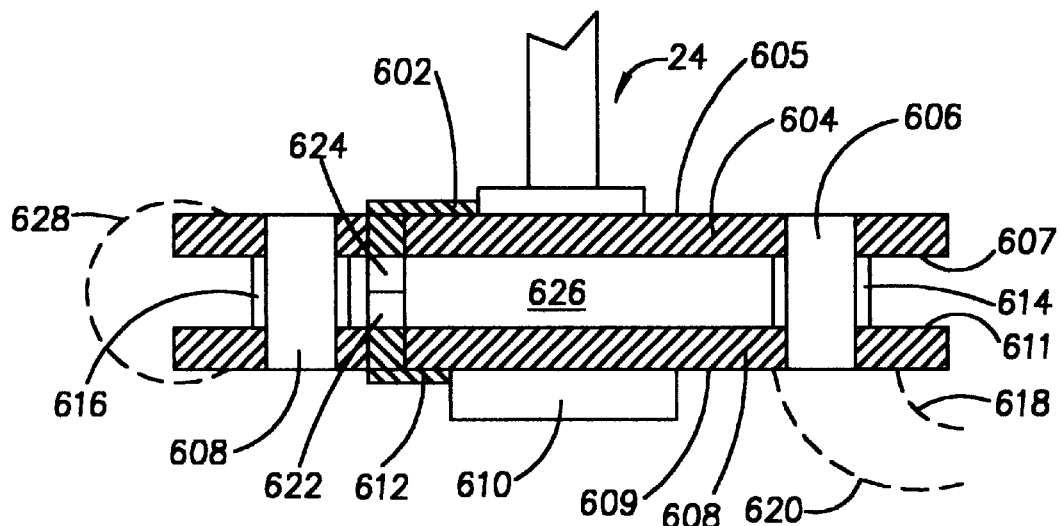
FIGS. 6A, 6B, 6C, and 6D are cross-sectional views of various embodiments of a compact circuit module having a pointer control device and associated circuitry of the present invention.
Figure 6B:
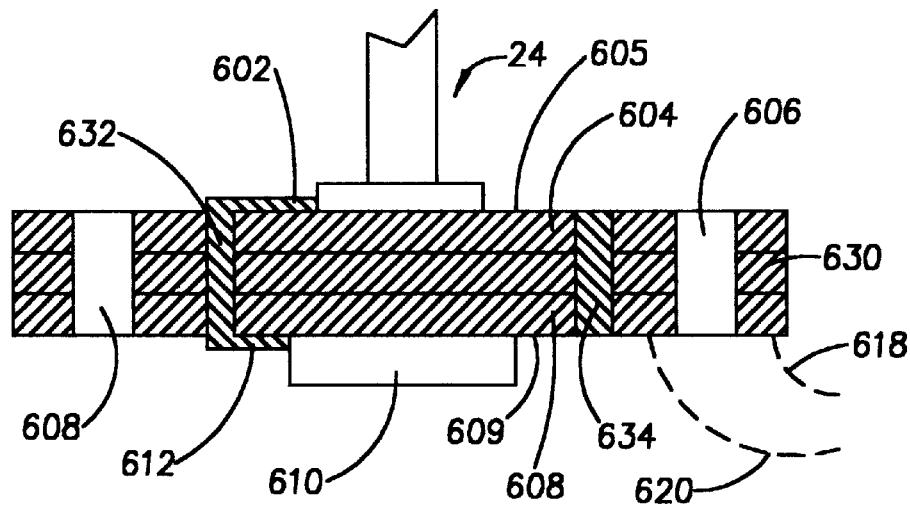
Figure 6C:
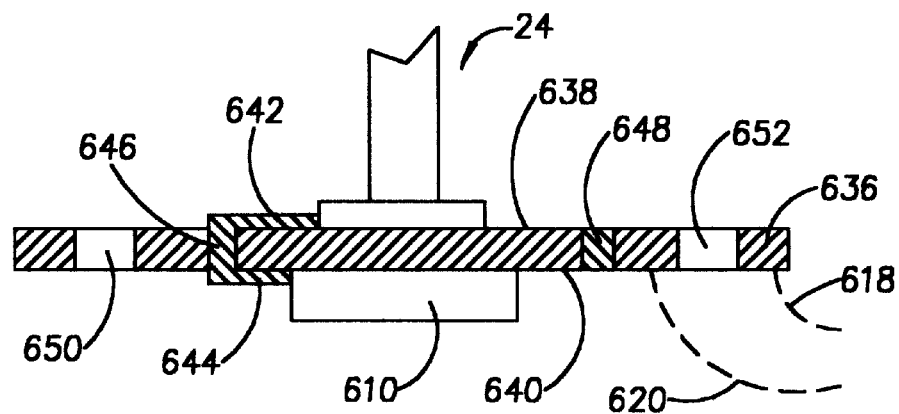

Illustrated in FIGS. 6A, 6B, and 6C are cross-sectional views of alternative embodiments of a compact modular pointing device and circuit board assembly of the present invention which incorporate the aforementioned requirements. More specifically, FIG. 6A illustrates a circuit board assembly having a plurality of substantially rigid spacer devices between circuit boards and an air gap therebetween. FIG. 6B illustrates a circuit board having a single, continuous, and substantially rigid spacer device between and in physical communication with a first and second circuit board. FIG. 6C illustrates a dual-sided, substantially rigid circuit board assembly. All three embodiments seek to provide a "space-saving" circuit board assembly design which is adaptable to digital equipment such as, for example, hand-held controllers, laptop or notebook computers, desktop computers, personal digital assistants, or any other machines or devices where compact and precise position and selection control is required.

Referring now specifically to FIG. 6A, the circuit board assembly has a first circuit board 604 and a second circuit board 608. The first circuit board 604 has a first mounting surface 605 and a second mounting surface 607. Attached to the first mounting surface 605 are pointing stick assembly 24 and at least one first circuit board track 602. A track is a conducting path in a circuit or circuit board, which forms interconnections. Tracks are typically made from conducting metals such as, for example, copper. The second circuit board 608 similarly has a first mounting surface 609 and a second mounting surface 611. Attached to the first mounting surface 609 are at least one circuit module 610 and at least one second circuit board track 612. The first and second circuit boards 604 and 608 are preferably made from a substantially rigid circuit board material. The at least one circuit module 610 includes circuitry such as, for example, micro-controllers, ASIC's (Application Specific Integrated Circuits), MCM's (Multi-Chip Modules), operational amplifiers, resistors, capacitors, inductors, memory circuits, bus controllers, or combinations thereof. The aforementioned list of circuits is not intended to be exhaustive.

The first circuit board 604 and the second circuit board 608 further have at least two openings formed therein such that passages 606 and 608 are formed when spacer devices 614 and 616 are placed as shown. The passages 606 and 608 are for rigidly securing the first circuit board 604 to the second circuit board 608 and for rigidly securing the entire circuit board assembly, via fasteners (not shown), for example, to the internal housing of a hand-held pointer control device of the present invention. The at least two openings and the spacer devices 614 and 616 preferably have substantially circular cross-sectional geometry. The spacer devices 614 and 616 are preferably made from a substantially rigid insulating material such as, for example, plastics or ceramics, and are dimensioned so as to minimize air gap 626 and yet provide for physical isolation and insulation of the first and second circuit boards 604 and 608.

The at least one first circuit board track 602 extends through the first circuit board 604 such that it is accessible from the second mounting surface 607. Similarly, the at least one second circuit board track 612 extends through the second circuit board 608 such that it is accessible from the second mounting surface 611. An electrical connection device (shown collectively as 622 and 624) is attached to the second mounting surfaces 607 and 611 at the locations where the at least one circuit board track of the first and second circuit boards are accessible. The electrical connection device 622 and 624 allows for the placing of at least one circuit board track 602 in circuit communication with at least one circuit board track 612. The electrical connection device 622 and 624 is preferably a hardwire connection device such as, for example, a jumper having first and second mating portions. Alternatively, a hardwire jumper from first mounting surface 605 of first circuit board 604 to first mounting surface 609 of second circuit board 608 can be employed to provide circuit communication between the two circuit boards. Hardwire connections 618 and 620 are for placing the circuit board assembly in circuit communication with external circuitry such as, for example, push-button switches and computer system(s).

Referring now to FIG. 6B, a second embodiment of the circuit board assembly of the present invention is shown. In particular, the circuit board assembly has a first circuit board 604 and a second circuit board 608. The first circuit board 604 has a first mounting surface 605 to which are attached pointing stick assembly 27 and at least one first circuit board track 602. The second circuit board 608 has a first mounting surface 609 to which are attached at least one circuit module 610 and at least one second circuit board track 612. The first and second circuit boards 604 and 608 are preferably made from a substantially rigid circuit board material.

A substantially rigid and continuous spacer 630 is disposed between the first and second circuit boards 604 and 608 and provides added structural rigidity and analog circuit isolation to the circuit board assembly. The substantially rigid and continuous spacer 630 is preferably bonded or cemented to first circuit board 604 and second circuit board 608 and is preferably made from plastics, ceramics, or other substantially rigid insulating material(s). First circuit board 604, second circuit board 608, and spacer 630 have at least two openings formed therein such that the openings form passages 606 and 608. The passages 606 and 608 are for rigidly securing the entire circuit board assembly, via fasteners (not shown), for example, to the internal housing of a hand-held pointer control device of the present invention and preferably include substantially circular cross-sectional geometries.

The circuit board assembly of FIG. 6B further includes at least one electrical via 632. The electrical via 632 extends through the first circuit board 604, spacer 630, and second circuit board 608 so as to place the at least one first circuit board track 602 in circuit communication with the at least one second circuit board track 612. Other electrical vias such as, for example electrical via 634, may also be provided for additional circuit connections.

Referring now to FIG. 6C, a third embodiment of the circuit board assembly of the present invention is shown. In particular, the circuit board assembly has a single, dual-sided circuit board 636. The circuit board 636 has a first mounting surface 638 and a second mounting surface 640, the mounting surfaces being oppositely disposed. Attached to the first mounting surface 638 are pointing stick assembly 27 and at least one first mounting surface track 642. Attached to the second mounting surface 640 are at least one circuit module 610 and at least one second mounting surface track 644. Circuit board 636 has at least two openings formed therein such that the openings form passages 650 and 652. The passages 650 and 652 are for rigidly securing the entire circuit board assembly, via fasteners (not shown), for example, to the internal housing of a hand-held pointer control device of the present invention. Passages 650 and 652 preferably have substantially circular cross-sectional geometries. Circuit board 636 is preferably made from a substantially rigid insulating material.

Circuit board 636 further includes at least one electrical via 646. The electrical via 646 extends through the circuit board 636 so as to provide circuit communication between the at least one first mounting surface track 642 and the at least second mounting surface track 644. Other electrical vias such as, for example electrical via 648, may also be provided for additional circuit connections. Of course, circuit module 610 could alternatively be mounted on a single-sided circuit board on the same surface as the pointing stick assembly 24.

So configured, the embodiments of FIGS. 6A–6C substantially minimize the "pickup" of digital signals into the analog circuit of the pointing stick assembly 24 and its circuit board tracks. Additionally, the embodiments of FIGS. 6A–6C allow for the incorporation of a pointing stick assembly and related circuitry in hand-held control devices and computer systems which have a finite, limited amount of space available for circuit inclusion. Accordingly, the embodiments of FIGS. 6A–6C provide a compact "space-saving" modular pointing device and circuit board assembly which does not intrude on the limited space of computers and hand-held controllers and provides the required electrical isolation and insulation from the noise generated by central processing units (CPU's), video lines, buses, or any other digital signal sources.

Figure 6D:
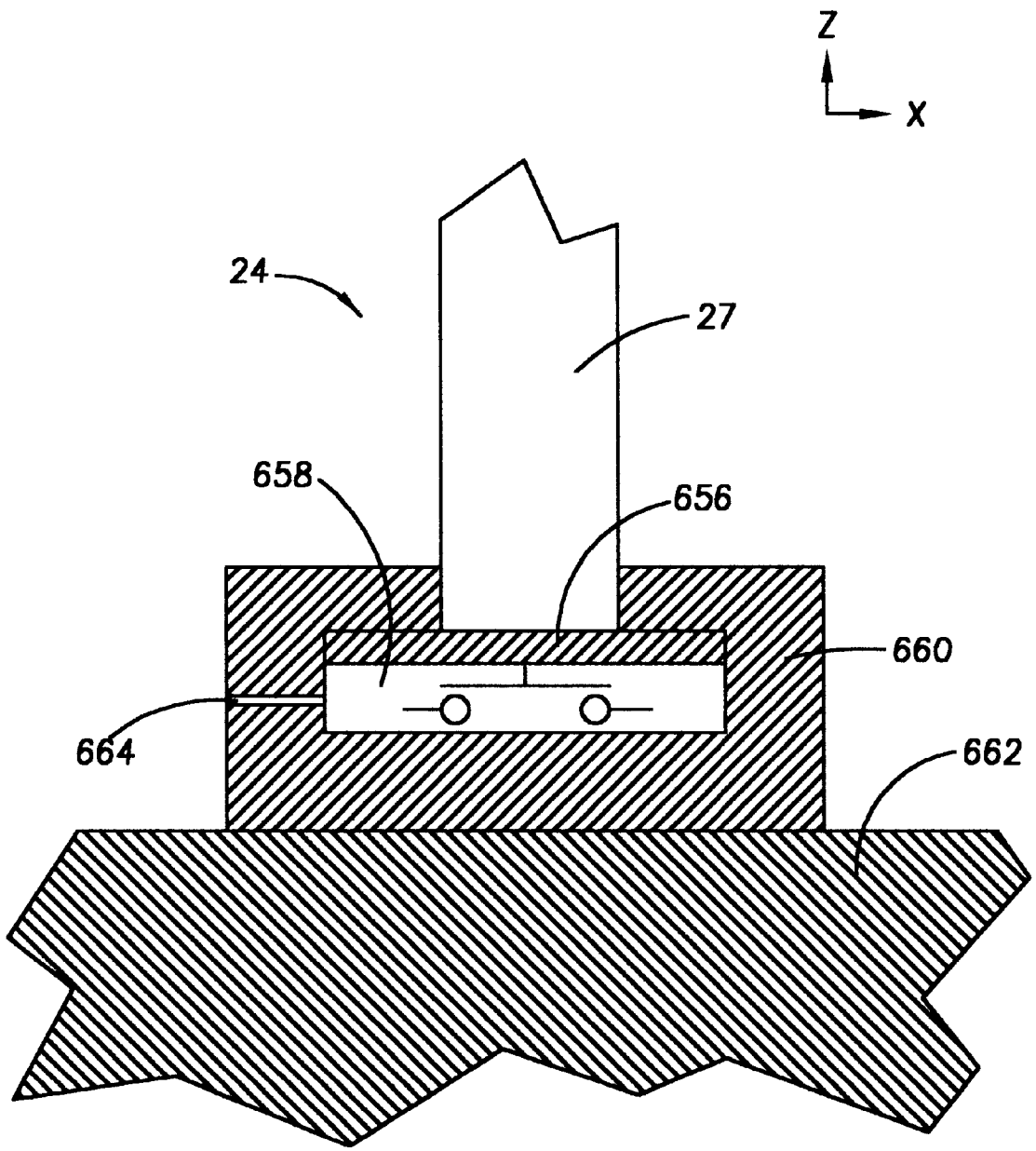

Illustrated in FIG. 6D is a cross-sectional view of a pointing stick assembly incorporating a Z-axis selection switch. The pointing stick assembly of FIG. 6D is mounted on a circuit board 662 and has a base 660, stick 27, force communicating device 656 and a Z-axis selection switch 658. The Z-axis selection switch and the force communicating device 656 are sealably housed within the base 660 with at least one electrical via 664 for providing external circuit communication. The Z-axis selection switch is preferably a biased two-position micro-switch or a force-sensing resistor. Alternatively, the Z-axis selection switch can be a piezoelectric transducer. In operation, a depression of the stick 27 in the Z-axis direction causes the stick 27 and the force communicating device 656 to displace towards the selection switch 658. Actuation of the switch occurs upon a pre-determined displacement of the stick 27 and force communicating device 656. The Z-axis selection switch 658 preferably produces a tactile and audible "response" which is commonly associated with the "clicking" of pointer device buttons such, for example, on mouse or track-ball pointers. Through such a construction, the pointing stick assembly 24 provides both pointer position control and corresponding input, as well as the combined "click and drag" function.

While the present invention has been illustrated by the description of embodiments thereof, and while the embodiments have been described in considerable detail, it is not the intention of applicants to restrict or in any way limit the scope of the appended claims to such detail. Additional advantages and modifications will readily appear to those skilled in the art. For example, materials and components such as, for example, passive components and microcontrollers, may be substituted; circuit diagrams may be modified, cross-sectional geometries and physical dimensions may be varied. Therefore, the invention, in its broader aspects, is not limited to the specific details, the representative apparatus, and illustrative examples shown and described. Accordingly, departures may be made from such details without departing from the spirit or scope of the applicants' general inventive concept.

What is claimed is:

1. A modular pointing stick and circuit board assembly for use with a machine having a display, the assembly having a circuit board comprising:
    (a) a first mounting surface having:
        (1) a pointing control stick assembly thereon; and
        (2) at least one first mounting surface electrical track in circuit communication with the pointing stick assembly;
    (b) a second mounting surface disposed generally opposite the first mounting surface and having:
        (1) circuitry for translating signals output from the pointing control stick assembly to the machine; and
        (2) at least one second mounting surface electrical track in circuit communication with the circuitry; and
    (c) at least one electrical via extending from the first mounting surface through to the second mounting surface and for placing the at least one first mounting surface electrical track in circuit communication with the at least one second mounting surface electrical track.

2. The assembly of claim 1 wherein the at least once electrical via extending from the first mounting surface through to the second mounting surface extends in a substantially vertical direction from the first mounting surface through to the second mounting surface.

3. The assembly of claim 1 wherein the pointing control stick assembly comprises a force-sensing resistor network and a riser member.

4. The assembly of claim 1 wherein the circuit board is a dual-sided, rigid circuit board.

5. The assembly of claim 1 further comprising a plurality of passages for fastening the assembly to a housing.

6. The assembly of claim 1 wherein the circuitry comprises a circuit selected from the group consisting of: micro-controllers, ASIC's (Application Specific Integrated Circuits), MCM's (Multi-Chip Modules), operational amplifiers, resistors, capacitors, inductors, memory circuits, bus controllers, or combinations thereof.

7. A modular pointing stick and circuit board assembly for use with a machine having a display, the assembly comprising:

(a) a first circuit board having a first and second mounting surface, the first mounting surface disposed generally opposite the second mounting surface; wherein
  (1) the first circuit board first mounting surface comprises:
    (i) a pointing control stick assembly; and
    (ii) at least one first circuit board first mounting surface electrical track in circuit communication with the pointing stick assembly;
(b) a second circuit board having a first and second mounting surface, the first mounting surface disposed generally opposite the second mounting surface; wherein
  (1) the second circuit board first mounting surface comprises:
    (i) circuitry for translating signals output from the pointing control stick assembly to the machine; and
    (ii) at least one second circuit board first mounting surface electrical track in circuit communication with the circuitry;
(c) a rigid insulating layer of material in physical communication with the first circuit board second mounting surface and the second circuit board second mounting surface; and
(d) at least one electrical via extending from the first circuit board first mounting surface through the rigid insulating layer of material to the second circuit board first mounting surface and for providing circuit communication between the at least one first circuit board first mounting surface electrical track and the at least one second circuit board first mounting surface electrical track.

8. The assembly of claim 7 wherein the at least one electrical via extending from the first circuit board first mounting surface through the rigid insulating layer of material to the second circuit board first mounting surface extends in a substantially vertical direction from the first circuit board first mounting surface.

9. The assembly of claim 7 wherein the rigid insulating layer is bonded to the first circuit board second mounting surface and the second circuit board second mounting surface.

10. The assembly of claim 7 wherein the rigid insulating layer comprises a material selected from the group consisting of: ceramics and insulators.

11. A modular pointing stick and circuit board assembly for use with a machine having a display, the assembly comprising:

(a) a first circuit board having a first and second mounting surface, the first mounting surface disposed generally opposite the second mounting surface; wherein
  (1) the first circuit board first mounting surface comprises:
    (i) a pointing control stick assembly; and
    (ii) at least one first circuit board first mounting surface electrical track in circuit communication with the pointing stick assembly;
(b) a second circuit board having a first and second mounting surface, the first mounting surface disposed generally opposite the second mounting surface; wherein
  (1) the second circuit board first mounting surface comprises:
    (i) circuitry for translating signals output from the pointing control stick assembly to the machine; and
    (ii) at least one second circuit board first mounting surface electrical track in circuit communication with the circuitry;
(c) an electrical connection device for providing circuit communication between the at least one first circuit board first mounting surface electrical track and the at least one second circuit board first mounting surface electrical track; and
(d) a fastening device for rigidly fastening the first and second circuit boards to each other in a generally overlapping configuration and for maintaining an air gap between the first and second circuit boards.

12. The assembly of 11 further comprising a spacer device generally disposed between the first and second circuit boards and in physical communication with the first and second circuit boards.

13. The assembly of claim 12 wherein the spacer device comprises at least one passage for allowing the fastener device to transgress the spacer device.

14. The assembly of claim 13 wherein the spacer device comprises a material selected from the group consisting of: ceramics and insulators.

15. The assembly of claim 11 wherein the electrical connection device is partly mounted on the first circuit board second mounting surface and partly on the second circuit board second mounting surface.

16. The assembly of claim 11 wherein the electrical connection device comprises at least one jumper device have mating first and second portions.

17. The assembly of claim 11 wherein the electrical connection device comprises at least one wire.

18. The assembly of claim 11 wherein the circuitry comprises a circuit selected from the group consisting of: micro-controllers, ASIC's (Application Specific Integrated Circuits), MCM's (Multi-Chip Modules), operational amplifiers, resistors, capacitors, inductors, memory circuits, bus controllers, or combinations thereof.

* * * * *